Patented Sept. 27, 1927.

1,643,772

UNITED STATES PATENT OFFICE.

ARTHUR S. HOYT, OF NEW YORK, N. Y.

PROCESS OF MAKING A NEW FOOD AND THE PRODUCT.

No Drawing.  Application filed May 15, 1926. Serial No. 109,362.

My invention relates to a process of making a new food and to the product, and its novelty consists in the successive steps of the process and also in the new product obtained thereby as will be more fully hereinafter pointed out.

There is a great demand for a food which is substantially free from carbohydrates as many people having diabetic tendencies cannot with safety eat food having any substantial amount of starch or sugar in it. The medical profession have also during the last few years advised people having a tendency to obesity that many of their physical troubles are due to the carbohydrates which they take in the ordinary forms of food. There are therefore two large classes of people who must eliminate starch and sugar bearing food from their diet and who at the same time must have a substitute to take the place of such carbohydrates which is palatable and high in nutriment value.

My process and the product resulting therefrom supply a food rich in gluten which furnishes the necessary nutriment and tissue building qualities so essential when starch is eliminated from the diet. It also contains practically no carbohydrates and therefore solves the problem of the diabetic and the person who is overweight, at the same time furnishing a palatable and nourishing food which fulfills all the requirements both as to nourishment and tissue building.

The ordinary wheat bran of commerce used in my process will not mix with gluten gum as such bran and gluten gum both carry a substantial amount of wheat oil, flour and starch which adheres thereto and prevents such mixing. This wheat oil causes rancidness if left in a food product and must be removed for this reason also. I have solved this problem by eliminating the wheat oil, flour and starch from the bran and gluten gum before mixing them together.

In carrying out my present invention, I prefer to make use of the gluten gum which is obtained during the manufacture of wheat starch. The usual procedure is to first grind the wheat which results in separating it into three parts, viz, flour, bran and middlings (sometimes called germs). This flour is made into a heavy dough which is put into washing machines of usual construction in which there is a constant flow of cold water which washes out from the mass a milk material which is starch in a liquid form, and the residue which is left in the washing machine is a mass of gluten gum substantially free from starch and flour. This starch and flour free gluten gum is then put into another or pulling type of washing machine and any remaining starch is then washed out by a cold water bath in said machine which is constantly draining at the bottom until there is no further starch in the drippings. This water is then entirely drained off and a hot water bath of about 160° is substituted in said machine which is still constantly draining at the bottom and by the pulling operation all parts of said gluten gum are exposed to said hot water until no further oil shows in the drippings whereby all of the wheat oil in said gluten gum is removed therefrom. A cold water bath is then substituted in order to harden the gluten gum which is softened by the hot water bath. I then take a suitable quantity of bran for my operation and place the same in a suitable container or mixer and add a solution of malt extract at a temperature of about 150° F. to thoroughly moisten the branch so that there will be some free solution of malt extract in the mixture. This mixture is maintained at a temperature of 140° F. for about two hours. The diastase of said malt extract being mixed with the bran and water makes the oil, starch and flour still adhering to the bran soluble and this I then draw off. The bran so treated may first be run through a bran dusting machine, then washed and dried, if it is desired, but it will be found necessary to use malt extract in order to eliminate the wheat oil, starch and flour still adhering to the bran, and bran as it comes from the mill can be treated as described with malt extract without first dusting, washing and drying.

I then take a suitable quantity of the wet mass of gluten gum which on analysis after it has been thus separated from the starch and wheat oil shows a protein content of about 80 percent and mix with it in a mixing machine, or in any other suitable manner to effect a thorough mixing, a suitable quantity of bran which has been freed of all wheat oil, starch and flour by means of the malt extract treatment as above described, and which bran will preferably be from the wheat that the gluten comes from, and I so mix the bran and gluten gum that the mixture will show a chemical test of any definite percent of protein desired. This mixture of wet gluten and bran which is then thoroughly mixed is put into a suitable tank or kettle and cooked in the open air at a temperature of about 200° F. until the mixture is thoroughly cooked, which under ordinary conditions will take about twenty minutes and will result in a gruel. This thoroughly cooked gruel is then sprayed or run on to hot steam rollers or on to a suitable hot metallic surface at a temperature of about 200° F. which will dry out the water and leave the residue on the hot surface in a thin film which breaks into flakes as it is scraped or removed from said hot surface.

In carrying out my process middlings or bran and middlings may be mixed with the wet gluten gum instead of the bran, and the food produced by my process will be full of nourishment and not too concentrated, as it will have in its composition sufficient cellulose or fibre to make a well balanced food material. It will be understood that the percentages or proportions of materials are only suggestive as these may be varied, and also the suggested temperatures may be varied while carrying out my process and producing the product of the same.

My process may also be carried out as above described by omitting the addition of any bran or middlings or anything of a cellulose nature and simply using the gluten gum which is first freed from all wheat oil and starch and then treated as set forth.

I claim:

1. The process of producing a food substantially free from carbohydrates and wheat oil comprising the elimination of all wheat oil and carbohydrates from wet gluten gum, cooking the same into a gruel and drying said gruel into thin flakes.

2. The process of producing a food substantially free from carbohydrates and wheat oil comprising the thorough mixing of wet gluten gum which has first been freed from all starch and wheat oil with bran which has first been freed from all wheat oil and carbohydrates by means of diastase in a malt extract, cooking said mixture into a gruel and drying said gruel into thin flakes.

3. The process of producing a food substantially free from carbohydrates and wheat oil comprising the elimination of all wheat oil and carbohydrates from bran and middlings and wet gluten gum, mixing said wet gluten gum with said bran and middlings, cooking said mixture into a gruel and drying said gruel into thin flakes.

4. The process of producing a food substantially free from carbohydrates and wheat oil comprising the thorough mixing of wet gluten gum which has first been freed from all starch and wheat oil with bran and middlings which have first been freed from all wheat oil and carbohydrates by means of diastase in a malt extract, cooking said mixture into a gruel and drying said gruel into thin flakes.

5. The process of producing a food substantially free from carbohydrates and wheat oil comprising the mixing of wet gluten gum which has first been freed from all starch and wheat oil with bran which has been entirely freed from wheat oil and carbohydrates, cooking said mixture into a gruel and drying the same.

6. A new food substantially free from carbohydrates and wheat oil comprising gluten free from wheat oil, flour and starch thoroughly cooked and dried in crisp flakes.

7. A new food substantially free from carbohydrates and wheat oil comprising a mixture of wheat oil free gluten, flour and wheat oil free bran thoroughly cooked and dried in crisp flakes.

8. A new food substantially free from carbohydrates and wheat oil comprising a mixture of wheat oil free gluten and flour and wheat oil free middlings thoroughly cooked and dried in crisp flakes.

9. The process of producing a food substantially free from carbohydrates comprising the washing out of starch from gluten gum in a cold self draining bath, washing out any starch remaining and all wheat oil in a hot bath during the pulling of said gluten gum in said bath and cooking the same into a gruel and drying into thin flakes.

10. The process of producing a food substantially free from carbohydrates comprising the washing out of starch from gluten gum in a cold self draining bath, washing out any starch remaining and all wheat oil in a hot bath during the pulling of said gluten gum in said bath, mixing said gluten with bran which has first been freed from all wheat oil and carbohydrates by means of diastase in a malt extract and cooking said mixture into a gruel and drying into thin flakes.

In testimony whereof I affix my signature.

ARTHUR S. HOYT.